United States Patent [19]

Gaertner

[11] 4,233,558
[45] Nov. 11, 1980

[54] REGULATED DUAL DC POWER SUPPLY

[75] Inventor: Robert F. Gaertner, San Marcos, Tex.

[73] Assignee: The United States of America as represented by the Secretary of the Navy, Washington, D.C.

[21] Appl. No.: 944,731

[22] Filed: Sep. 22, 1978

[51] Int. Cl.³ .................... H02P 13/26; H05F 1/64
[52] U.S. Cl. ................................. 323/17; 323/34; 323/38; 363/88; 363/50
[58] Field of Search ............... 323/17, 22 SC, 34, 38, 323/DIG. 1; 363/35, 50-54, 78-79, 85-86, 128, 88

[56] References Cited

U.S. PATENT DOCUMENTS

| | | | |
|---|---|---|---|
| 3,577,708 | 5/1971 | Drenning et al. | 323/34 X |
| 3,671,853 | 6/1972 | Weischedel et al. | 323/38 X |
| 3,691,452 | 9/1972 | Aguiar | 323/34 X |
| 3,693,069 | 9/1972 | Kelley, Jr. et al. | 323/34 X |
| 4,004,214 | 1/1977 | Evans | 323/19 |
| 4,034,232 | 7/1977 | Laventure | 323/17 X |

Primary Examiner—William M. Shoop
Assistant Examiner—Peter S. Wong
Attorney, Agent, or Firm—Richard S. Sciascia; Harvey A. David

[57] ABSTRACT

A dual section power supply, one section for supplying high voltage dc power and the other section for supplying low voltage dc power, are each connected to a common ac source. The high voltage section employs a phase-controlled rectifier, the control circuit for which employs logic signal development using timer techniques dependent on the amplitude of voltage deviation from the intended regulated output level. Each of two low voltage sections employs a power switch controlled by sampling and pulse steering techniques to effect fixed high frequency, variable duty cycle switching. An inhibit input is supplied from each of the low voltage sections to the high voltage section to prevent a high voltage output to the load in the absence of low voltage development.

9 Claims, 7 Drawing Figures

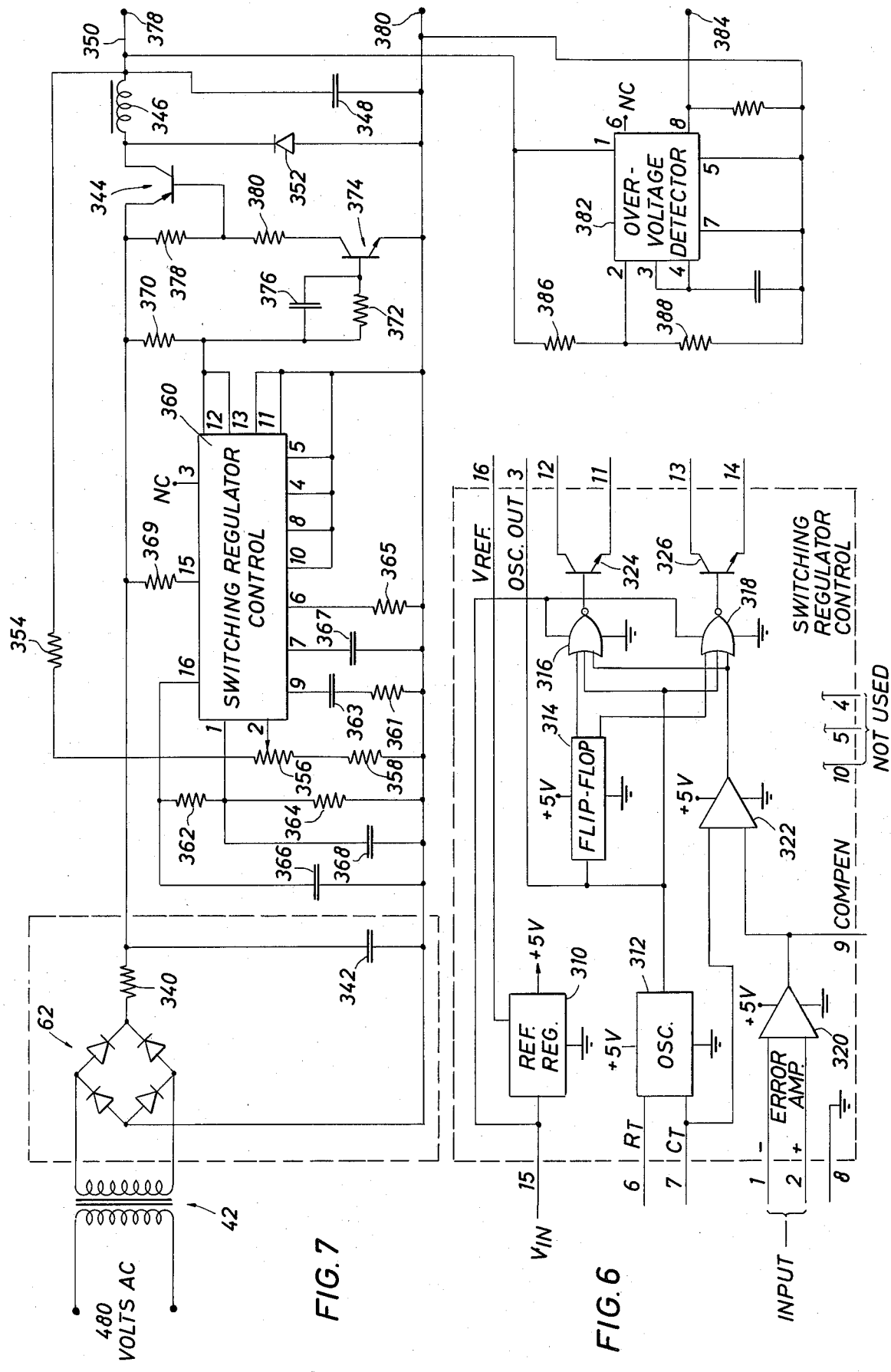

REGULATED DUAL DC POWER SUPPLY

BACKGROUND OF THE INVENTION

1. Field of the Invention

This invention relates to power supply regulation and particularly to establishment and regulation of both a low voltage dc supply and the establishment and regulation of a high voltage dc supply for operating complex high intensity, gaseous discharge lamp circuits.

2. Description of the Prior Art

The maintenance of power to a load, even in the presence of momentary interruptions, is critical in many applications. However, none may be more critical than in systems wherein the load is represented by high intensity, gaseous discharge lamps. The reason for this is that even momentary cessation of power will cause the lamps to go out, requiring normally two minutes and longer to restrike and even longer to reach full brightness.

In addition to the maintenance of power in the presence of line voltage interruptions, it is also highly desirable to maintain a relatively stable voltage to many loads, such as lamp circuits, even if there are no line voltage interruptions. The main reason for this is to ensure against fluctuations that may shorten lamp life or otherwise cause lamp injury.

Circuits in the past have employed combinations of resistors, capacitors and even diodes to provide regulation to power supplies, but these have amounted to little more than filtering systems preventing widely varying excursions.

Circuits providing power regulation to the power section of circuits connected to operate high intensity gaseous discharge lamp networks have previously been developed. One circuit somewhat suitable for providing a degree of desirable regulation is disclosed in FIG. 7 of copending Patent Application Ser. No. 898,309, filed Apr. 20, 1978, a continuation of Patent Application Ser. No. 654,926, now abandoned, commonly assigned. In that circuit, a phototransistor controlled across the dc output of the power supply determines the application of gate voltage to a triac. This conduction timing determines the operation of a bridge in the power supply, and hence provides regulation.

This circuit does not ensure against sudden surges opening the power circuit. More importantly, perhaps, it does not ensure the maintenance of a dc voltage output in the presence of momentary interruptions of the line source of ac power.

Another circuit for overcoming some of the quick response problems of this earlier circuit is disclosed in copending Patent Application Ser. No. 808,969, filed June 22, 1977, also commonly assigned. In that circuit, there was the fundamental problem of not quickly removing regulation in the presence of ac source voltage outages and therefore, the regulation circuit attempted regulation at the very time that regulation was not possible. This circuit assures that under these conditions, the circuit operation will be dependent on dc voltage stored on large storage capacitors. Further refinements of this latter circuit to overcome some of the difficulties still remaining are disclosed in Patent Application Ser. No. 927,554, filed July 24, 1978, also commonly assigned.

The advent of sophisticated dimming and other control circuits have made it desirable to supply not only closely regulated high power dc voltage to high intensity, gaseous discharge networks, but also to apply closely or highly regulated low power dc voltage to such networks for providing power to these control circuits, a problem not addressed in the prior art circuits discussed above.

It is highly desirable, of course, to derive power for operating both high voltage circuit components, as well as low voltage components, from a common high voltage ac source. As mentioned above, it is also then desirable that both types of voltages be regulated. It is further important that high voltage not be supplied to the lamp network if there is an absence of the low voltage output. In addition, it is important that the most suitable type of regulation circuit be provided for the production of high voltage regulation as well as low voltage regulation, which do not employ the same kind of regulation techniques. For example, switching regulation at low power is highly desirable since it is relatively simpler than phase-controlled bridge operation, more efficient and creates less heat. Furthermore, switching regulation at relatively high frequency, e.g., 20 KHz, allows the use of relatively small components, which are correspondingly less expensive. Fast switching still accomplishes suitable fast reaction for changes in line supply voltage or changes in load. On the other hand, phase-controlled bridge operation for high power is desirable since large and expensive switching semiconductors do not have to be employed that would otherwise be needed to handle large voltages and currents.

Therefore, it is a feature of this invention to provide an improved dc regulation circuit having the dual functions of providing both high voltage dc and low voltage dc for such applications as to one or more high intensity, gaseous discharge lamp systems, the absence of low voltage dc inhibiting development of high voltage dc.

It is another feature of the present invention to provide an improved high voltage dc power and control network providing phase control to a bridge regulator as developed from precision timer networks, the outputs of which are suitably isolated from the gate drive elements providing the phase control.

It is still another feature of the present invention to provide an improved low voltage switching regulator employing a pulse width modulator for providing constant frequency, variable duty cycle switching to the output power device thereof.

SUMMARY OF THE INVENTION

A power supply is provided operated from a high voltage ac source, the high voltage section providing phase-controlled bridge operation and the low voltage sections each providing switching regulation.

The power portion of the high voltage section includes a bridge rectifier having gated semiconductors in two legs thereof, the timing of the gate signals thereto determining the output level from the bridge. The control portion of the high voltage section samples the output and develops a voltage for successively developing an error output level from a comparator, a time constant voltage to a first timer, a variable width pulse output from the first timer, and a pulse from a second timer occurring at the end of the first timer's pulse. Logic circuits are used to steer alternate pulses each half cycle of the ac source to isolation and amplifier components. The outputs are then used to gate the semiconductor in the bridge of the power section.

Each of two low voltage sections also includes sampling of the output for use in determining an error voltage via a comparator. The comparator is connected to logic components for steering drive current to alternate acting switching transistors driven at a fixed high frequency rate. The duty cycle of the switching transistors is determined by the error voltage. The combined outputs from the transistors are connected to subsequently provide switching of a power transistor through which unregulated dc is applied. The output from the power switching transistor is sustained by an inductive storage element. The duration of on to off of the power transistor regulates the output to compensate for connection to large or small loads.

A logic signal is developed when there is a suitable low voltage output for removing an inhibit gate to the high voltage control portion.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings:

FIG. 6 is a simplified schematic diagram of a switching regulator control network employed in each of the low voltage dc regulators shown in FIG. 1.

FIG. 7 is a schematic diagram of one of the low voltage dc regulators shown in FIG. 1.

DESCRIPTION OF THE PREFERRED EMBODIMENT

Figure 1:
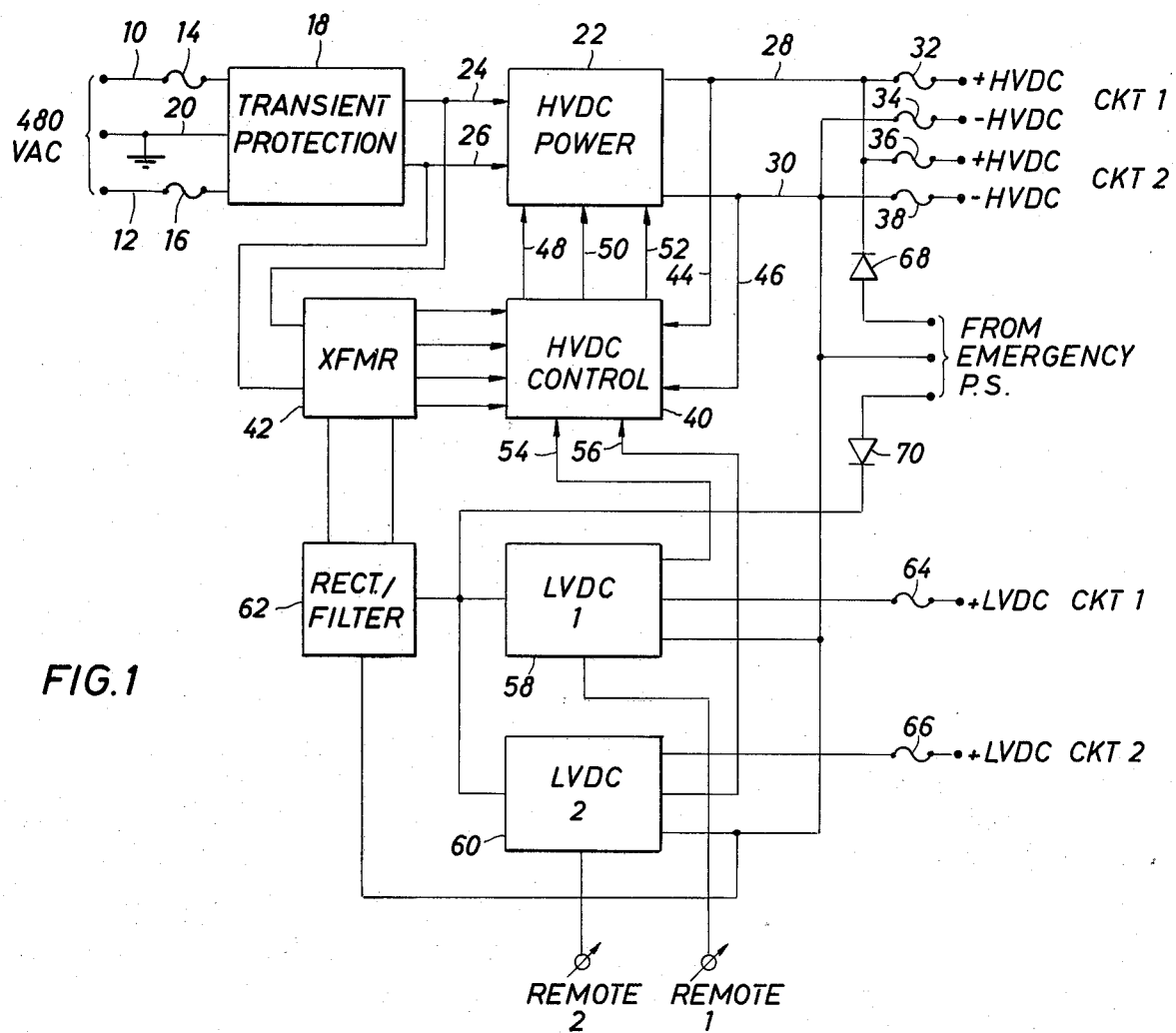
FIG. 1 is an overall block diagram of a power supply in accordance with the present invention suitable for employing both regulated high voltage dc power and low voltage dc power from a common ac source.

Now referring to the drawings and first to FIG. 1, a regulated power supply is shown for providing both regulated low voltage dc and regulated high voltage dc from a common high voltage ac source, indicated on the drawing as 480 volts ac. The output produces voltage suitable for operating one or more circuits comprising a plurality of high intensity, gaseous discharge lamps, such as metal halide, mercury vapor and sodium vapor lamps. Such lamp circuits can be operated by applying a high dc voltage as the primary power voltage, for example, typically at 360 volts dc for 400 watt lamps, and low voltage dc, for example, typically at 20 volts dc. The low voltage requirements are useful to provide intensity adjustment capabiity or other control operation of the lamps, which adjustments may be different for one group of lamps connected in a first circuit compared with a second group of lamps connected in a second circuit. Therefore, two separate low voltage outputs are provided for two separate circuits. In corresponding fashion, two separate high voltage circuits are provided so that each circuit can have its own corresponding high voltage source.

Now returning to FIG. 1, 480 volts ac is applied on input lines 10 and 12 through overvoltage protection fuses 14 and 16, respectively, to transient protection network 18. A common or ground connection wire 20 is also provided. The output from the transient protection network is applied to the high voltage dc power network 22 via lines 24 and 26. The output from high voltage dc power network 22 is brought out on lines 28 and 30, branch connections being provided for both positive voltage and negative voltage output so as to provide a total of four output lines. Two of these output lines to a first circuit are connected through fuses 32 and 34 and the other two of these output lines are provided through fuses 36 and 38 to a second circuit.

The high voltage control network 40 receives power via transformer 42, whose inputs are connected to lines 24 and 26 from transient protection circuit 18. Two 20-volt ac connections supply operating power for the control network in a manner hereafter explained.

In simple operation of control network 40, the output power of power network 22 on lines 28 and 30 is sampled and connected to control network 40 via lines 44 and 46. The connections are employed within network 40 to adjust or modify the level of the output voltage from network 22 via connecting lines 48, 50 and 52 thereto.

Lines 54 and 56 from low voltage dc network 58 and low voltage network 60, respectively, inhibit the operation of control network 40 when there is no low voltage dc being produced from both of the low voltage networks. The inhibiting of the control network is reflected in inhibiting the operation of the power network.

The output from the entire high voltage power and control section of the circuit just described is at a nominal 360 volts.

Each of the low voltage networks receives its operating power via rectifier/filter network 62, which, in turn, derives its power from transformer 42. Networks 58 and 60 are substantially identical and can be referred to as switching regulators operating in a manner hereafter described. In any event, each circuit provides a nominal 20 volts dc output. Network 58 supplies its output through fuse 64 and network 60 supplies its output through fuse 66. The actual operating level can be adjusted remotely, remote control 1 being connected to low voltage dc network 58 and remote control 2 being connected to low voltage dc network 60.

In case of emergency, batteries producing a nominal 324 volts dc are applied through diodes to the two respective portions of the power supply just described. Diode 68 provides power to the two high voltage circuits 1 and 2 and diode 70 provides a path to the inputs of the two low voltage dc circuits. Since dimming can be very critical to how long a lamp circuit is capable of operating on battery power, and since the low voltage outputs are useful for providing control voltage for this purpose, connection from the batteries is desirably through diode 70 to the input of these low voltage networks so that the dimming adjustments are still operable. The two low voltage dc circuits permit independent dimming of the lamps connected respectively thereto.

Another advantage of having two high voltage circuits, rather than merely one, is so that the installation wiring can be kept to a number 10 wire size or smaller, making wiring at installation much easier than with a larger sized wire.

Figure 2:
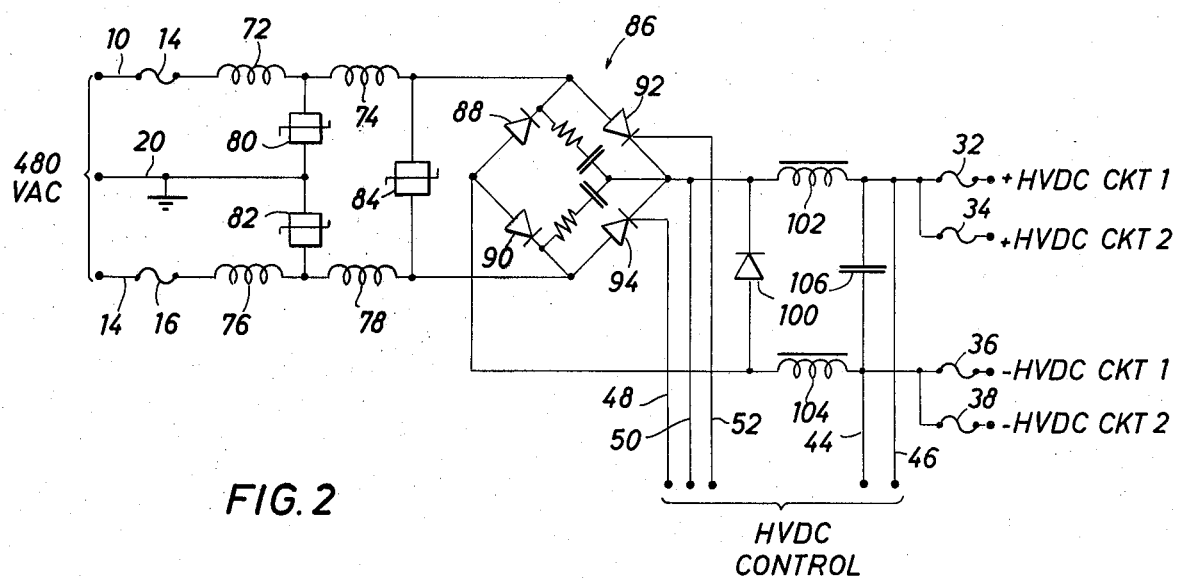
FIG. 2 is a schematic diagram of the power portion of the high voltage dc regulator shown in FIG. 1.

Now referring to FIG. 2, the high voltage dc power network 22 and those circuits which precede it are shown in expanded detail. As noted above, the 480 volts ac input is applied through power fuses 14 and 16 to the transient protection circuit comprising inductors 72 and 74 connected in series with fuse 14 and inductors 76 and 78 connected in series with fuse 16. Varistor 80 is connected between the junction point of inductors 72 and 74 to common or ground line 20 and varistor 82 is connected between the common point between inductors 76 and 78 and common line 20. Varistor 84 is connected across the output lines of the transient protection circuit.

The purpose of the entire protection network is to reduce the amplitude of input transients to levels which can be tolerated by the power devices to follow. The network comprising inductor 72 and varistor 80 reduce the transients from line 10 to common; inductor 76 and varistor 82 reduce the transients from line 14 to common; and the network comprising inductors 74 and 78 and varistor 84 reduce line-to-line transients.

Bridge network 86 achieves rectification of the ac voltage applied thereto and supplies a regulated output, regulation being provided by phase controlling the gated semiconductor devices in two of the legs.

Bridge circuit 86 is a rectifier connected to the two input power lines following the transient protection network just described, the basic bridge comprising back-to-back diodes 88 and 90 connected across the two input power lines and SCR's 92 and 94 connected front-to-front across the two input power lines. The output from the bridge is taken from the common connection of the diodes and the common connection of the SCR's. It should also be noted that the SCR's are each connected in parallel with a series combination of a resistor and a compacitor to provide snubber operation by providing a limitation of the rate of voltage change across the respective SCR's. The gate of SCR 92 and the gate of SCR 94 are connected respectively to lines 52 and 48 from the high voltage dc control network and line 50 is connected to the high voltage side of bridge 86.

The connections to the gates of the SCR's provide phase angle operation of the SCR's as controlled by the high voltage dc control network in a manner to be hereafter described. Such phase angle control provides a constant dc output of the overall circuit for application to a load, such as a lamp driver.

The output from the bridge, prior to being presented through fuses to be ultimately used by the circuits, is connected across free-wheeling diode 100. In series with the respective lines are inductors 102 and 104 and capacitor 106 is connected across the output. The inductors are quite large and provide smoothing of the output. The free-wheeling diode reduces ripple and increases the power factor of the circuit.

Output lines 44 and 46 provide means for sampling the output for operation of the control network. Inductors 102 and 104 may be characterized as swing chokes providing higher reactance at lower currents to provide load regulation as well as smoothing the output.

The high voltage control circuit to be described below in connection with the description of FIG. 4, uses timer networks 164, 174 and 272. It is convenient to use a standard Model 555 timer for each of these timer networks, or, in the alternative, to use one-half of a standard Model 556 timer, each of these timers being produced by many manufacturers. Timers comprising discrete components and functioning in the manner hereafter described may also be used.

Figure 3:
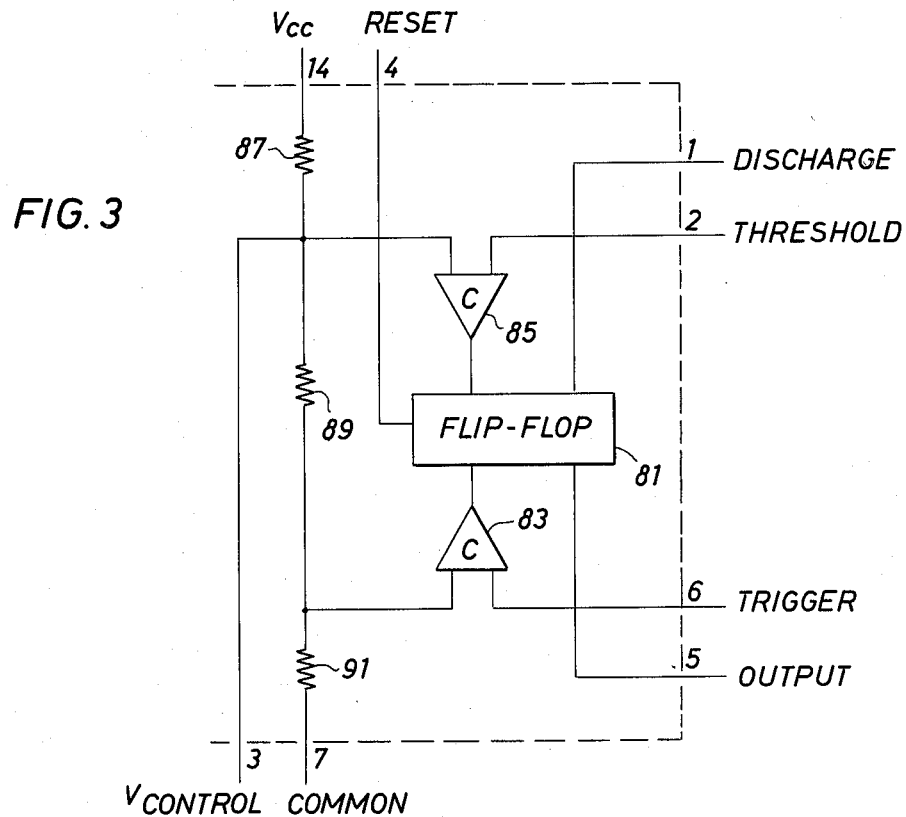
FIG. 3 is a simplified schematic diagram of a timer network employed in the control portion of the high voltage dc regulator shown in FIG. 1.

For convenience of description, FIG. 3 shows the simplified internal pin connections to a first half of a Model 556 timer.

In operation, a trigger input is applied to pin 6 when the voltage thereto drops below a predetermined level. Normally this level is one-third of the $V_{cc}$ value applied to pin 14. When this occurs, internal comparator 83, sampling the trigger input and an internal voltage level of one-third $V_{cc}$ via a voltage divider, causes internal flip-flop 81 to change state so that a high level voltage is applied to pin 5. Hence, output pin 5 of the timer produces a positive-going leading edge of a pulse with the occurrence of a trigger at pin 6.

When there is no control voltage applied to pin 3, then the voltage divider comprising internal resistors 87, 89 and 91 establish one input to another comparator 85 at two-thirds the $V_{cc}$ voltage applied at pin 14. The threshold input at pin 2 is the other input to comparator 85. Therefore, when the threshold voltage level exceeds two-thirds $V_{cc}$, the flip-flop again changes state to produce a negative-going output to pin 5, producing the negative-going trailing edge of the output. The change of state of flip-flop 81 also places a zero level output on pin 1. Hence, the voltage on discharge pin 1 follows the voltage level on output pin 5. That is, the voltage levels on both pins 1 and 5 go up and down together.

Figure 4:
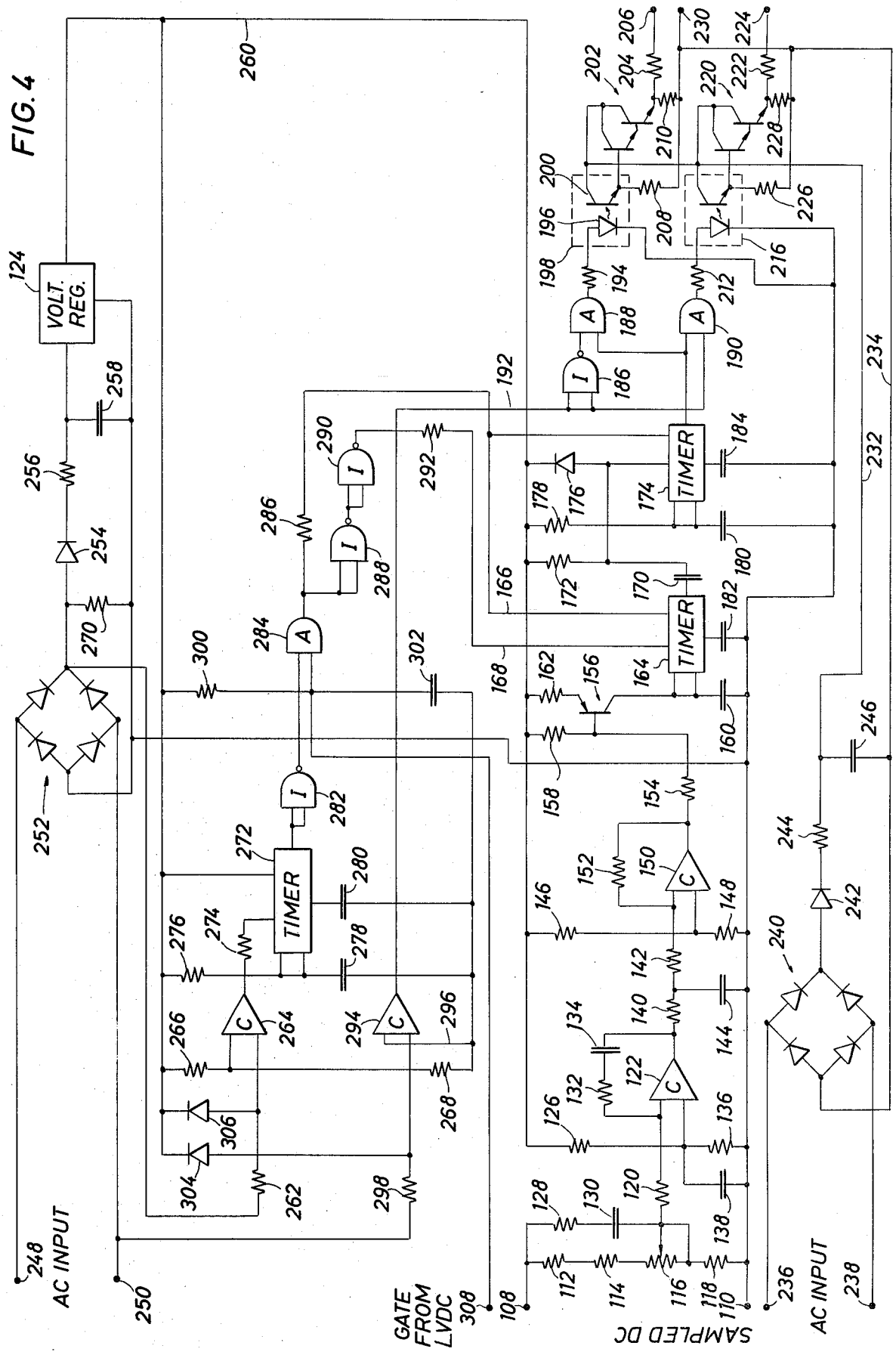
FIG. 4 is a schematic diagram of the control portion of the high voltage dc regulator shown in FIG. 1.

Now referring to FIG. 4, a schematic diagram is shown of the high voltage dc control network. A sampling of the high voltage dc power output is applied across terminals 108 and 110 to a voltage divider comprising four series resistors, 112, 114, 116 and 118. Resistor 116 may be a potentiometer for providing an adjustment. Assuming that a nominal 360 volts dc is applied across the input terminals, the voltage division reduces the voltage at the wiper of resistor 116 to approximately 2.5 volts. The sample voltage is applied through resistor 120 to an operational amplifier operating as a comparator 122, where the voltage is compared to a reference voltage derived from a fixed voltage regulator 124 via resistors 126 and 136 to produce an error voltage output. Resistor 128 and capacitor 130 in series therewith are connected in parallel with the high voltage portion of the input voltage divider to provide phase compensation. In similar fashion, resistor 132 and capacitor 134 in series therewith are connected around comparator 122 so that together with resistor 120 further phase compensation is provided. The reference voltage supplied to comparator 122 is determined by resistor 126 and resistor 136 forming a voltage divider therewith, capacitor 138 being connected in parallel with resistor 136 to provide a soft start feature or slow voltage build-up for the reference voltage to the comparator during the period of warmup.

The output from comparator 122 is supplied through series resistors 140 and 142, capacitor 144 being connected therebetween, to provide high frequency filtering. Resistors 146 and 148 are connected to a second operational amplifier operating as comparator 150 in a manner similar to resistors 126 and 136. The output of this comparator provides signal inversion and level shifting. Resistor 152 around comparator 150 provides a feedback path for gain set purposes. The output of comparator 150 is applied through resistor 154 to the base of pnp transistor 156. Resistor 154 operates as a bias resistor voltage divider with resistor 158 to transistor 156. The conduction of transistor 156 depends on the base drive applied thereto. Assuming a constant voltage level on the base of the transistor, the transistor becomes a constant current source for charging capacitor 160 via resistor 162 in the emitter connection of the transistor. Therefore, resistor 162, capacitor 160 and transistor 156 operate as a linear time-constant network for producing an output to timer network 164. Build up is from a discharged capacitor 160 (capacitor 160 is discharged at the end of the timing period or with the occurrence of a reset voltage). The build up of charge is linear as opposed to an exponential charge build up in the absence of a constant current generator. Such a linear ramp provides precision of operation by approaching the critical threshold level for operating timer 164 at a steeper rate than a conventional time constant network, which approaches a threshold level asymptotically.

Timer 164 is reset via line 166 and, at a very brief regular interval thereafter, a trigger initiates the timing action via line 168. Reset and trigger impulses are applied at a predetermined time at the beginning of each half cycle of the ac input in a manner hereinafter described. However, it is important to note that the initial output of timer 164 is produced at a fixed relationship with respect to the initiation of each half ac cycle. The conclusion event of timer 164 is determined by the ramp build-up thereafter on capacitor 160.

Capacitor 170 and resistor 172 connected to the output of timer 164 form a differentiator, which establishes a negative pulse for application to timer 174, diode 176 providing a clamp to the supply voltage line. The output pulse width of timer 174 is determined by the time constant network comprising resistor 178 and capacitor 180. These components are not adjustable and operate as a fixed duration time constant network. Capacitors 182 and 184 are respective bypass filter capacitors for the two timer circuits.

The output from timer 174 is a fixed pulse width gate signal occurring at a time determined by the error voltage developed from comparing the sampled input with a fixed voltage standard.

The output from timer 174 in the form of a timing pulse is applied to a gating network comprising three AND gates 186, 188 and 190, gate 186 also being an inverter. The connection of the three gates are standard, the other input being a square wave input on line 192, which corresponds in time to the sine wave of the ac input. The positive half cycles of the waveform on line 192 permit a timing output from AND gate 190 during each positive half cycle of square wave on line 192. Gate 186 inverts the negative half cycle of the voltage on line 192 and permits passage of the timing pulse from timer 174 to pass through AND gate 188 during each of these previously negative half cycles. Therefore, during alternate half cycles of the applied ac input there is a timing output first from AND gate 190 and then from AND gate 188 so that there is an output from one or the other corresponding to each half cycle of applied input.

The output pulse from AND gate 188 is applied to an isolation network in the form of an optocoupler. The output from AND gate 188 is applied through current limiting resistor 194 to the LED 196 of optocoupler 198. The optocoupler provides pulse coupling and isolation. The output of the npn transistor 200 of optocoupler 198 is applied to Darlington amplifier 202, the output from which is applied through series resistor 204 to output terminal 206. Resistors 208 and 210 are the conventional emitter resistors.

In like manner, the output from AND gate 190 is applied through current limiting resistor 212 to LED 214 of optocoupler 216. Output transistor 218 of the optocoupler produces an output to Darlington amplifier 220, the output from which is applied through series resistor 222 to output terminal 224. Resistors 226 and 228 are the emitter resistors. The common output terminal is terminal 230.

The purpose of a Darlington amplifier is to produce an output pulse which is at a sufficient level suitable for gate activation of the SCR's in the bridge network of the power output circuit shown in FIG. 2.

The bias voltage for operating the isolated optocoupler and Darlington networks is supplied via lines 232 and 234 from a bridge and filter network connected to receive low voltage ac from transformer 42 via terminals 236 and 238. A conventional bridge 240 produces dc rectification, which is subsequently supplied through blocking diode 242 and current limiting resistor 244. The output from the bridge network is filtered by capacitor 246.

Separate ac connections from transformer 42 apply ac voltage via terminals 248 and 250 to rectifier bridge 252. In a manner similar to that just described, the output from the bridge is furnished through blocking diode 254, current limiting resistor 256 and filter capacitor 258 to voltage regulator 124. The voltage regulator is preferably Motorola Model MC7705CT; however, comparable fixed voltage regulators are manufactured by others. The voltage regulator operates in much the same manner as a Zener diode for purposes of discussion, merely supplying a fixed voltage output on line 260 for operation of the lower part of the circuit, as previously discussed, and for operation of the remaining components.

The output from bridge 252 supplies its output through series dropping resistor 262 to an operational amplifier connected as a comparator 264. The other input to a comparator is a fixed voltage level supplied via line 260 and resistors 266 and 268 connected as a voltage divider. A nominal 1-volt level is used as the reference level for this comparator.

Resistor 270 connected to the output of the bridge assures that the transition point between each rectified half wave cycle is pulled to ground or common level.

Timer 272 receives an output from comparator 264 through resistor 274. It should be noted that although there is an output from comparator 264 at the time the input on 262 reduces to the 1-volt level, the leading edge is dependable but the total output pulse may not be. That is, the comparator output is subject to noise development. Therefore, initiating the output from timer 272 achieves the desired positive action required for circuit operation. Resistor 276 and capacitor 278 determine the ramp build-up for the timer operation and hence the duration of the timer output pulse. The bypass filter capacitor is capacitor 280. The duration of the output pulse of the timer is sufficiently long that the occurrence of the conclusion event of the pulse occurs after the initiation of the next half cycle of ac input. This is because since resistor 276 and capacitor 278 receive a fixed voltage, the output pulse has a fixed width determined by these two component values.

The output from timer 272 is inverted in AND gate and inverter 282 and is applied through AND gate 284 to be applied as the input reset voltage to timers 164 and 174 via resistor 286. The output from AND gate 284 is applied through two series connected AND circuits 288 and 290, which also each include an inverter, for purposes of achieviing a slight delay. The output from AND gate 290 is applied through resistor 292 on line 168 as the trigger input to timer 164. It should be noted that the trigger input occurs at a fixed time with respect to each half cycle of ac input and is provided as a negative trigger value for operation of timer 164 following reset thereof by the pulse applied on line 166.

An operational amplifier operating as a comparator 294 has its reference voltage tied to common by line 296. The other input to comparator 294 is via resistor 298, which is connected directly to the ac input line. Therefore, each zero crossing of the sine wave of the ac input produces a corresponding square wave output from comparator 294, which is, in turn, supplied on line 192 to the gating network previously described.

The output from AND gate 284 provides means for holding timers 164 and 174 low to inhibit pulse generation therefrom. Resistor 300 and capacitor 302 provide an inhibiting voltage during power turn on and, hence, before stable operation is achieved.

Diodes 304 and 306 provide clamping of the respective operational amplifiers 264 and 294 to the supply voltage on line 260.

Input terminal 308 is connected to receive an output from each of the low voltage dc power supplies, which are hereafter described. For simplicitiy, only one connection is shown. The connection of terminal 308 is to AND gate 284 and therefore provides inhibiting of any output generation from the overall circuit until there is a sufficient low voltage supplied to terminal 308 for activation of the AND gate.

Figure 5:
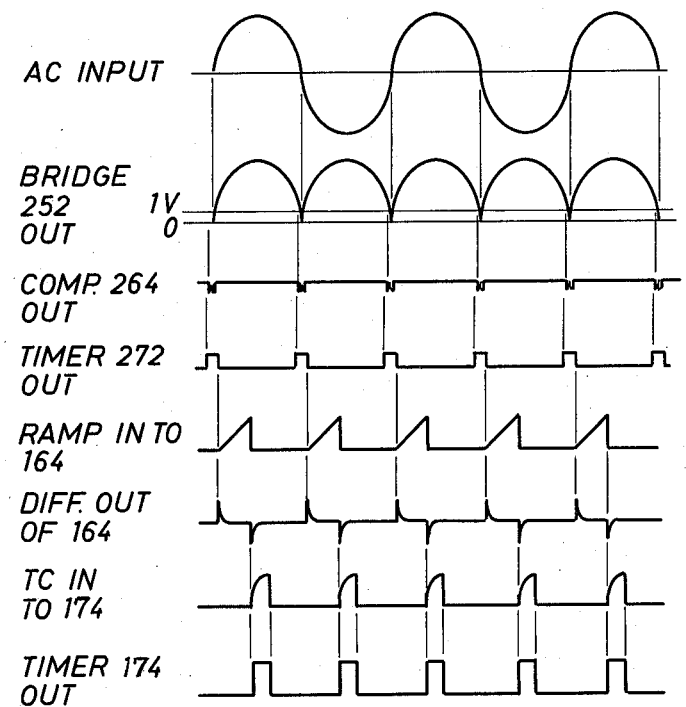
FIG. 5 is a waveform diagram showing the relative occurrence and shapes of many of the important voltages occurring in the circuit shown in FIG. 4.

Now referring to FIG. 5, a diagram of some of the wave forms important in the operation of the circuit of FIG. 4 is illustrated. The ac input on terminals 248 and 250 is a regular sine wave. The output of bridge 252 illustrates full wave rectification. The 1-volt level which is illustrated in the second wave form is the 1-volt reference which is applied to comparator 264. It may be noted that the comparator produces an output which is somewhat noisy. The timer output from timer 272, on the other hand, is initiated by the leading edge of the comparator output pulse and extends for a slightly longer period then the zero crossing pulse produced from the comparator so as to make the subsequent circuits immune from noise resulting from the rectified sine wave since the zero crossing may cause the comparator to switch one or more times during this short interval.

The ramp wave form is initiated at a time dependent on the trailing edge of the timer 272 output and is linear so as to produce from timer 164 a positive pulse whose duration and timing coincide with the ramp. Capacitor 110 and resistor 112 differentiate this pulse and apply it to the trigger input of timer 174, as shown. The negative output corresponds to the trailing edge of the ramp. The time constant network comprising resistor 178 and capacitor 180 determines the width of the output from timer 174. It is this output which is divided in the gating network to operate on the two lines corresponding to the alternate half cycles of the ac input.

Each of the low voltage dc circuits employ an integrated circuit known as a regulating pulse width modulator. The circuit that has actually been employed by applicant is Silicon General Model SG3524, although other models operating at different temperature ranges are available from Silicon General and other comparable circuits produced by Motorola, Texas Instruments and other manufacturers are also available. The SG3524 circuit is shown in FIG. 6 in simplified form.

The input on pin 15 is an unregulated dc voltage. Internal reference regulator 310 produces the reference voltage for the internal components of the circuit as well as supplying a reference voltage at pin 16 for external connection. Pins 6 and 7 provide connection points for a resistor and a capacitor to determine the frequency of operation of an internal oscillator 312. As is hereafter noted, the frequency of operation of oscillator 312 is preferably at 20 KHz, and is available on pin 3. Internally, the oscillator output is connected to internal pulse steering flip-flop network 314, which produces alternate positive and negative outputs to NOR gates 316 and 318.

Inputs on pin 1 and 2 are applied to comparator 320, the output of which is applied to a second comparator 322, as further compensated with the network on pin 9. The reference input for the second comparator is the input on pin 7, which is a ramp signal, the slope of which is determined by its external connection. The output from comparator 322 is applied to the NOR gates. The output from NOR gate 316 is applied as the drive to npn transistor 324 and the output from other NOR gate 318 is applied as the drive to npn transistor 326. The collector and emitter connections to transistor 324 are pins 12 and 11, respectively, and the collector and emitter connections to transistor 326 are pins 13 and 14, respectively. Pin 8 is ground. In operation, the transistors function as dual alternating switches.

There are other connections and other components on an SG3524 board, but they are not used in the application hereafter described.

Now referring to FIG. 7, one of the low voltage dc networks 58 and 60 is shown, connected to transformer 42 and rectifier/filter network 62. Bridge network 62 converts the ac input to dc in conventional fashion. Series resistor 340 and large capacitor 342 remove line surges to supply unregulated dc at approximately 35 volts to the emitter of pnp power transistor 344. This transistor is switched on and off to supply a rectangular output to inductor 346, which operates with capacitor 348 as a filter tuned to filter out the switching frequency of 20 KHz.

Inductor 346 is a storage element and maintains a voltage output that is established in a preferred embodiment of the present invention at a nominal 20 volts dc. This output is supplied to its subsequent load on line 350. When transistor 344 is shut off, then diode 352, connected between the collector of transistor 344 and common, operates as a free-wheeling diode to maintain a current flow path for operation of the inductor. Together, inductor 346 and capacitor 348 act to average the chopped wave from transistor 344.

The output voltage level is sensed by a voltage divider comprising resistor 354, variable resistor 356 and resistor 358. The output from the wiper of resistor 356 (remote control 1 and remote control 2 shown in FIG. 1 for networks 58 and 60, respectively) is supplied as a nominal 2.5 volts via pin 2 to comparator 320 inside switching regulator control network 360. This is the same network which is described above with respect to FIG. 6. The reference 2.5 volts dc to this network is furnished on pin 1, resistors 362 and 364 establishing the level from the internal regulated 5 volts made available on pin 16 of network 360, as further filtered by capacitors 366 and 368.

Inside switching regulator control network 360, there is produced a switching signal at a nominal 20 KHz rate. Regular drive sequencing is applied to alternate drive transistors 324 and 326 where there is no error voltage from comparator 320. That is, the ramp input on pin 7 and the compensation input on pin 9 establish a regular output occurrence to gates 316 and 318. As soon as there is an error voltage, the output event from comparator 322 to each gate 316 and 318 is affected to lengthen or shorten the ratio of positive-to-negative voltage applied from these gates. By lengthening the time interval between initiating and conclusion events, time of occurrence of the trailing edge from the leading edge is delayed to effectively lengthen the duty cycle. Hence, the drive to each of the alternate switching transistors is a constant frequency, variable duty cycle type drive, the amount of turn off time within each cycle being determined by the amount of error voltage detected by comparator 320 as a result of sampling the regulated voltage.

Resistor 361 and capacitor 363 provide phase compensation via comparator 322 to switching regulator control 360 and resistor 365 and capacitor 367, connected respectively to pins 6 and 7, provide the necessary components for assuring operation of the internal oscillator at 20 KHz. Finally, resistor 369 provides a dropping resistor to apply the unregulated voltage input to pin 15 of the switching regulator control network.

As is shown in FIG. 7, the two outputs of the switching transistors in network 360 are connected in parallel, loaded by resistor 370 and applied through current limiting resistor 372 to npn switching transistor 374. Transistor 374 is connected for supplying base drive current to power switching transistor 344. Capacitor 376 speeds up the action for the turning off operation of this transistor.

In operation, transistors 374 and 344 operate together to provide the necessary regulation in the output. Therefore, when there is a small load, and hence a small current drain from the circuit so as to reduce the output voltage, then storage inductor 346 can maintain the desirable output value with only a short conduction time of transistor 344. On the other hand, a large load placing a substantial drain on the circuit results in transistor 344 being on for substantially longer periods of time in order to maintain the output level at the desired value.

The output from the circuit is applied to terminals 378 and 380 and to overvoltage detector 382. Overvoltage detector is preferably an integrated circuit Model MC3423, produced by Motorola and other producers, for developing a logic-type two level output to terminal 384, the output therefrom changing state when there is a sufficiently large output supplied to it. This value is set at 18 volts for the exemplary circuit just described. Input resistors 386 and 388 form a voltage divider to determine the level of operation for network 382 to change state so as to produce the gating output. The output is supplied to the high voltage control circuit via line 54 or 56 (FIG. 1) to releasably activate an inhibit gate to allow the high voltage dc power network 22 to produce an output. Hence, when the power networks shown in FIG. 1 are used in conjunction with the operation of a high intensity, gaseous discharge lamp circuit, detector 382 assures that low voltage dc is present before high voltage dc is applied.

While a particular embodiment of the invention has been shown and described, it will be understood that the invention is not limited thereto, since many modifications may be made and will become apparent to those skilled in the art. For example, the voltages described are exemplary, other voltages being applicable to other types of loads, which include devices other than lamps as well as lamps of different wattage ratings.

What is claimed is:

1. A power supply for providing both regulated low voltage dc and regulated high voltage dc from a common high voltage ac source, comprising
   (1) at least one low voltage switching regulator, including
      a rectifier connected to the ac source voltage to produce a low unregulated dc voltage,
      semiconductor switching means connected to said rectifier to produce a switched output therefrom,
      storage means connected to said switching means for maintaining the output therefrom at a regulated dc level during periods of switch off of said semiconductor switching means,
      drive means for turning said semiconductor switching means on and off at a constant high frequency rate, and
      duty cycle determining means connected to the output of said semiconductor switching means and to said drive means for varying the ratio of on to off of said semiconductor switching means in accordance with the amplitude variation from a predetermined level for said output to provide duty cycle regulation thereof;
   (2) a phase-controlled high voltage bridge regulator, including
      a high voltage rectifying bridge network having power switching semiconductors in at least two legs thereof, the phase timing of supply gate voltages to said semiconductors with respect to the occurrence of the cycles in the ac source determining the dc output from said bridge network,
      control means for producing respective gate voltages to said power switching semiconductors during alternate half cycles of the ac source voltage, said control means comprising
         means for sampling a portion of the high voltage dc to be regulated and developing an error voltage that said portion of the high voltage deviates from a predetermined value,
         trigger means connected to the ac source voltage for creating a trigger voltage with the occurrence of each half cycle thereof,
         timer means connected to said trigger means producing an output following the occurrence of a trigger from said trigger means,
         a controllable time constant network connected to said timer means and to said sampling means for creating a threshold voltage to said timer means at a time dependent on the amplitude of said error voltage,
         first logic means operably connected to the ac source voltage for producing a first polarity output corresponding to positive half cycles thereof and a second polarity output corresponding to negative half cycles thereof and to the output of said timer means to produce a first timing output during said first polarity and a second timing output during said second polarity output, and output means connected to receive each of said first and second timing outputs and producing said supply gate voltages; and (3) second logic means operably connected to the output of said semiconductor switching means of said low voltage switching regulator and to said trigger means of said high voltage regulator to inhibit said trigger voltage therefrom when the output from said semiconductor switching means is below a predetermined level and hence to inhibit the output from said high voltage regulator until there is an output from said low voltage regulator larger than a predetermined minimum level.

2. A phase-controlled high voltage bridge regulator for producing regulated high voltage dc from a high voltage ac source, comprising a high voltage rectifying bridge network having power switching semiconductors in at least two legs thereof, the phase timing of supply gate voltages to said semiconductors with respect to the occurrence of the cycles in the ac source determining the dc output from said bridge network, control means for producing respective gate voltages to said power switching semiconductors during alternate half cycles of the ac source voltage, said control means comprising means for sampling a portion of the high voltage dc to be regulated and developing an error voltage that said portion of the high voltage deviates from a predetermined value, trigger means connected to the ac source voltage for creating a trigger voltage with the occurrence of each half cycle thereof, timer means connected to said trigger means producing an output following the occurrence of a trigger from said trigger means, a controllable time constant network connected to said timer means and to said sampling means for creating a threshold voltage to said timer means at a time dependent on the amplitude of said error voltage, logic means operably connected to the ac source voltage and said timer means for producing a first polarity output corresponding to positive half cycles thereof and a second polarity output corresponding to negative half cycles thereof and to the output of said timer means to produce a first timing output during said first polarity and a second timing output during said second polarity output, and output means connected to receive each of said first and second timing outputs and producing said supply gate voltages.

3. A high voltage regulator in accordance with claim 2, wherein said power switching semiconductor are SCR's.

4. A high voltage regulator in accordance with claim 2, wherein said sampling means includes a voltage divider connected to the output of said bridge network, and comparator means connected to said voltage divider for producing an output dependent on the output that the voltage from said divider deviates from a preestablished level to said comparator.

5. A high voltage regulator in accordance with claim 2, wherein said trigger means includes a rectifier connected to said ac source to produce a full wave rectified voltage, a comparator connected to said rectifier for producing an output pulse when the rectified voltage waveform reduces to a predetermined level each half cycle thereof, and a timer for producing a square wave pulse from the leading edge of the pulse produced from said comparator.

6. A high voltage regulator in accordance with claim 2, wherein said controllable time constant network includes a capacitor, and a constant current source connected to said capacitor including a current generator producing a current proportional to said error voltage for charging said capacitor at a proportional linear rate.

7. A high voltage regulator in accordance with claim 6, wherein said constant current source includes a semiconductor and a drive circuit therefor, the voltage to said drive circuit determining the amount of current conduction through said semiconductor to be applied to said capacitor.

8. A high voltage regulator in accordance with claim 2, wherein said logic means includes a comparator connected to the ac source for producing a square wave output coextensive therewith, and sub-logic means connected to said comparator and to said timer means connected to said comparator and to said timer means, said logic means including first AND gate for producing a first output during a first polarity of said square wave, and inverter and second AND gate for producing a second timing output during a second polarity of said square wave.

9. A high voltage regulator in accordance with claim 2, wherein said output means includes a separate optocoupler, the respective LED's thereof connected to said first and second timing outputs, and a separate amplifier connected respectively to the photo-output portion of each of said optocouplers.

* * * * *

UNITED STATES PATENT AND TRADEMARK OFFICE
CERTIFICATE OF CORRECTION

PATENT NO. : 4,233,558

DATED : November 11, 1980

INVENTOR(S) : Robert F. Gaertner

It is certified that error appears in the above–identified patent and that said Letters Patent are hereby corrected as shown below:

Assignee: "The United States of America as represented by the Secretary of the Navy, Washington, D.C." should read --Esquire, Inc.--.

Attorney, Agent or Firm: "Richard S. Sciascia; Harvey A. David" should read --Frank S. Vaden III--.

Signed and Sealed this

Twenty-eighth Day of April 1981

[SEAL]

Attest:

RENE D. TEGTMEYER

Attesting Officer

Acting Commissioner of Patents and Trademarks